United States Patent [19]

Lipcon et al.

[11] Patent Number: 4,744,025
[45] Date of Patent: May 10, 1988

[54] ARRANGEMENT FOR EXPANDING MEMORY CAPACITY

[75] Inventors: Jesse B. Lipcon, Harvard; Barry A. Maskas, Marlboro, both of Mass.

[73] Assignee: Digital Equipment Corporation, Maynard, Mass.

[21] Appl. No.: 21,522

[22] Filed: Feb. 26, 1987

Related U.S. Application Data

[63] Continuation of Ser. No. 729,610, May 2, 1985, abandoned.

[51] Int. Cl.⁴ .............................................. G06F 12/06
[52] U.S. Cl. ........................................................ 364/200
[58] Field of Search ... 364/200 MS File, 900 MS File

[56] References Cited

U.S. PATENT DOCUMENTS

| | | | |
|---|---|---|---|
| 4,025,703 | 5/1977 | Kaufman et al. | 364/200 |
| 4,281,392 | 7/1981 | Grants et al. | 364/900 |
| 4,330,825 | 5/1982 | Girard | 364/200 |
| 4,468,729 | 8/1984 | Schwartz | 364/200 |
| 4,545,010 | 10/1985 | Salas et al. | 364/200 |
| 4,562,532 | 12/1985 | Nishizawa et al. | 364/200 |
| 4,571,676 | 2/1986 | Mantellina et al. | 364/200 |

Primary Examiner—Gary V. Harkcom
Assistant Examiner—David L. Clark
Attorney, Agent, or Firm—Finnegan, Henderson, Farabow, Garrett & Dunner

[57] ABSTRACT

An expandable memory connected to a central processing unit includes several memory modules which transfer configuration signals serially to the central processing unit by way of an interface circuit. The interface circuit also selects ones of the memory modules for access by the central processing unit according to the configuration signals.

7 Claims, 3 Drawing Sheets

| 4 | 3 | ID'S 2 | 1 | 0 | SLOT 1 | SLOT 2 | SYSTEM MEMORY | |
|---|---|---|---|---|---|---|---|---|
| H | H | H | H | H |  |  | 1 B | B = BANK OF MEMORY |
| H | H | H | H | L | 1 B |  | 2 B | |
| H | H | H | L | H | 2 B |  | 3 B | ← 101 |
| H | H | H | L | L | 4 B |  | 5 B | |
| H | H | L | H | L | 1 B | 1 B | 3 B | |
| H | H | L | L | H | 2 B | 1 B | 4 B | ← 103 |
| H | H | L | L | L | 4 B | 1 B | 6 B | |
| H | L | H | H | L | 1 B | 2 B | 4 B | |
| H | L | H | L | H | 2 B | 2 B | 5 B | |
| H | L | H | L | L | 4 B | 2 B | 7 B | |
| H | L | L | H | L | 1 B | 4 B | 6 B | |
| H | L | L | L | H | 2 B | 4 B | 7 B | |
| H | L | L | L | L | 4 B | 4 B | 9 B | | ns
ARRANGEMENT FOR EXPANDING MEMORY CAPACITY

This is a continuation of application Ser. No. 729,610, filed May 2, 1985 and now abandoned.

BACKGROUND OF THE INVENTION

In prior art data processing systems if the user wanted to expand the memory capacity it has been the practice to add memory subsystems along a general memory bus. Generallly, such memory subsystems have been composed of many memory array modules. Each array module has been designed to interface to the bus and has its own controller circuitry for memory array signal timing generation. When such a subsystem has been subjected to alteration in size, either a new subsystem has been substituted or the array modules have been manually reconfigured to assume the proper relative position within the memory subsystem. Such reconfiguration typically involved setting switches, wire-wrapping shunt posts, and/or soldering in various types of shunts. Such practices have created installation problems and reliability problems which in the final analysis result in higher computer system costs. The present invention enables the user to readily expand or reduce the memory capacity by employing one or more universal expandable memory circuit cards.

SUMMARY OF THE INVENTION

In the computer system, or data processing system, having the expandable memory circuit cards, there are circuit paths, within the bus system, that enable a lower level expandable memory circuit card to be connected directly to a higher level expandable memory card. An expandable memory card in the present system (and in preferred embodiment by way of example), may carry one, two, or four banks of memory, and said system may contain, by way of example, up to two cards. When one such card is plugged into the system, the CPU is able to address the memory banks held by that card directly because the card generates coded signals which indicate to the CPU how much memory is present and the addressable location of such memory. The CPU system uses such coded signals to address the particular bank of memory amongst many banks of memory if the card is holding many banks of memory. In the event that there are two cards plugged into slots in the computer system, the coded signals from the second slot (lower order slot) will be transmitted directly to combining circuitry on the card in the first slot. The combining circuitry on the first slot card will combine the two sets of coded signals and provide to the computer system a combined set of coded signals which signals are indicative of the amount of combined memory provided by the presence of two expandable memory circuit cards.

BRIEF DESCRIPTION OF THE DRAWINGS

The objects and features of the present invention will be better understood in view of the following description studied in conjunction with the drawings wherein.

DETAILED DESCRIPTION OF THE PREFERRED EMBODIMENTS

Figure 1:
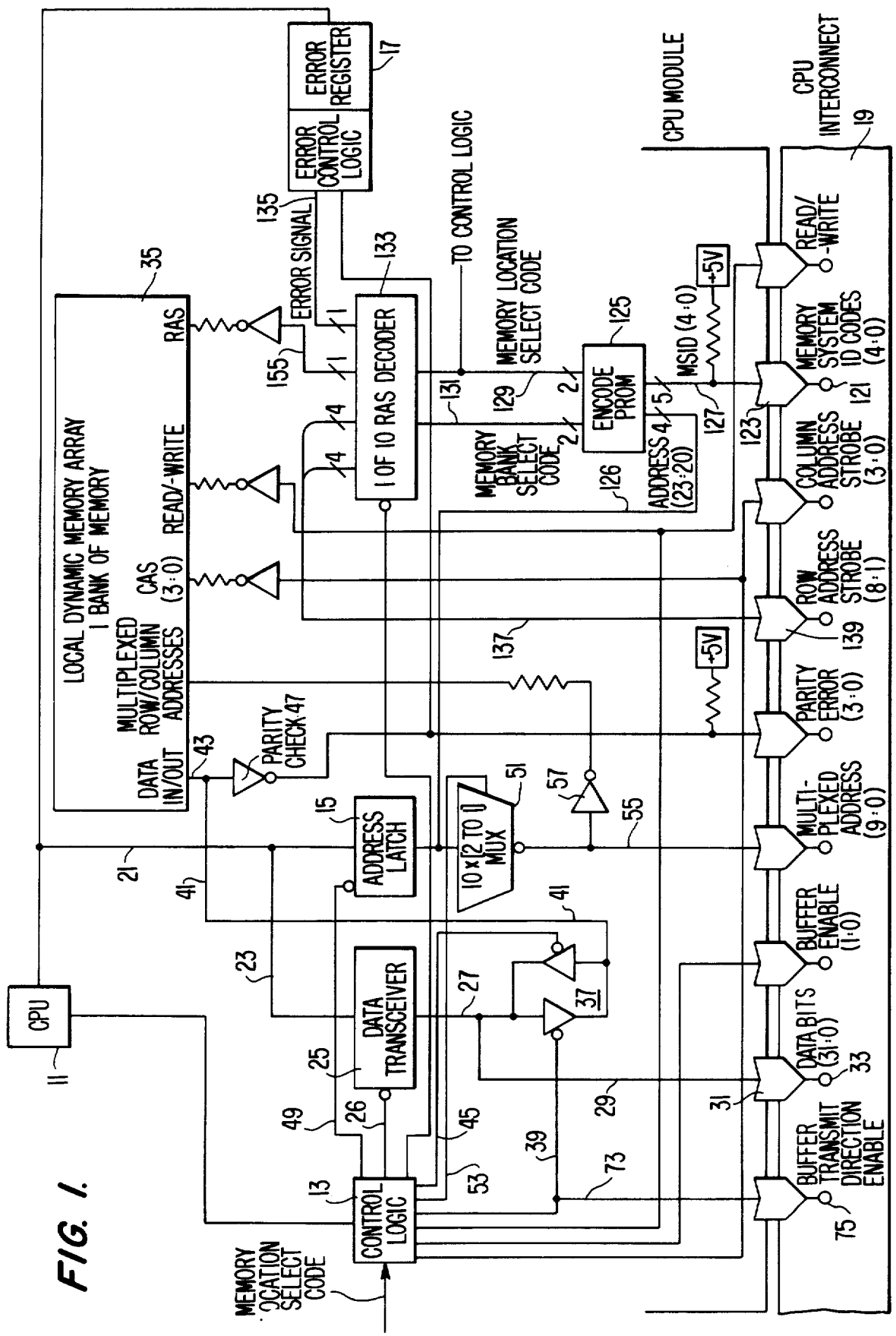
FIG. 1 is a block, schematic diagram showing local memory control circuitry and decoding circuitry employed by the dataprocessing system.

Consider FIG. 1. In FIG. 1 there is shown a CPU 11 (Central Processor Unit) of a data processing system. It should be understood that a great deal of the hardware associated with a normal data processing system is not shown, described or claimed hereinafter because such hardware is not related to the present invention. The control logic 13 can be any one of a number of logic circuit devices which responds to a command signal from the CPU to generate control signals or enable signals at the proper times and transmit such signals to the correct components. In a preferred embodiment the control logic 13 is a 825105AN Field Programmable Logic Sequencer, F174, F74, F537, F32 manufactured by Signetics or Fairchild. When data signals are transmitted from, or to, the CPU 11 they are transmitted along the lines 21 and 23, through the data transceiver 25, along lines 27 and 29, through the connector 31 to the lines (depicted as terminal 33) in the CPU interconnect bus 19. It should be understood that the lines such as 21 and 23 as well as the terminals, such as terminal 33, represent a plurality of lines which carry a group of signals in parallel. Returning to the discussion of data transfer and the CPU, we find that if data is being transferred from some part of the system to the CPU 11, such data passes from the lines of the bus 19, at terminals 33, through connector 31, along lines 29 and 27, through data transceiver 25, along lines 23 and 21 into the CPU 11. The data transceiver 25 is a bidirectional data path device and in the preferred embodiment is a F245 manufactured by Fairchild. It should be noted that data transceiver 25 is enabled by a control signal on line 26 from the control logic 13.

When the CPU 11 is transmitting data signals to the memory array on memory array card 35, the data signals pass from the data transceiver 25 to the data transceiver 37. The "data in" path of data transceiver 37 is enabled by a control signal on line 39. The data signals leave the data transceiver 37, along lines 41 to the data in/out port 43 of the memory array card 35. When data signals are transmitted from the memory array on the memory array card 35, such data signals pass in the opposite direction from that same path along lines 41, through the "data out" path of the data transceiver 37, either back to the data transceiver 25 (if the data signals are going to the CPU 11) or along lines 29. The "data out" path of data transceiver 37 is enabled by a control signal on line 45 from the control logic 13.

It should be understood that in a preferred embodiment the data transceiver 37 is a AM29853 manufactured by Advanced Micro Devices, and that the parity check circuit 47 is part of transceiver 37. When data signals are transmitted through the data transceiver 37, a parity value is generated for every eight bits. In the preferred embodiment the system is a 32 bit word system and for every eight bits (eight bits to a byte) a parity value is generated. When data transceiver 37 has generated a parity value, it is transmitted to the parity check device which compares the trailing parity value of each byte from memory with the generated parity value from transceiver 37. The parity generation and check are not involved in the present invention but have been described to provide a complete description of the system so that the invention can be better appreciated.

When the CPU 11 transmits address signals, they are sent to the address latch 15. In the preferred embodiment, there is a need for ten bits of information for a column address and ten bits of information for a row address. In addition, (as will be better understood hereinafter) there is a need for four bits of information to determine what memory card is to be addressed and what bank of memory on that card. Hence there is a need for twenty four bits of information in an address. The twenty four bits are transmitted to the address latch 15. The address latch 15 is enabled by a control signal, from the control logic 13, on line 49. The low order twenty bits are transmitted, ten bits at a time, through the multiplexer (MUX) 51. The MUX 51 multiplexes the groups of ten bits in response to a control signal on line 53.

The bursts of ten bits (the column and row addresses) are transmitted along lines 55 to the CPU interconnect bus 19 and simultaneously to the memory array card 35, through the buffer 57. The column and row address signals are held in latches in memory devices on the local memory array card 35 and likewise in memory devices on the expandable memory circuit cards with one latch for each bank of memory. It is the generation of the row address strobe signal (RAS) that selects the latch that is to be activated and therefore the bank of memory which the program intends to address.

Figure 2:
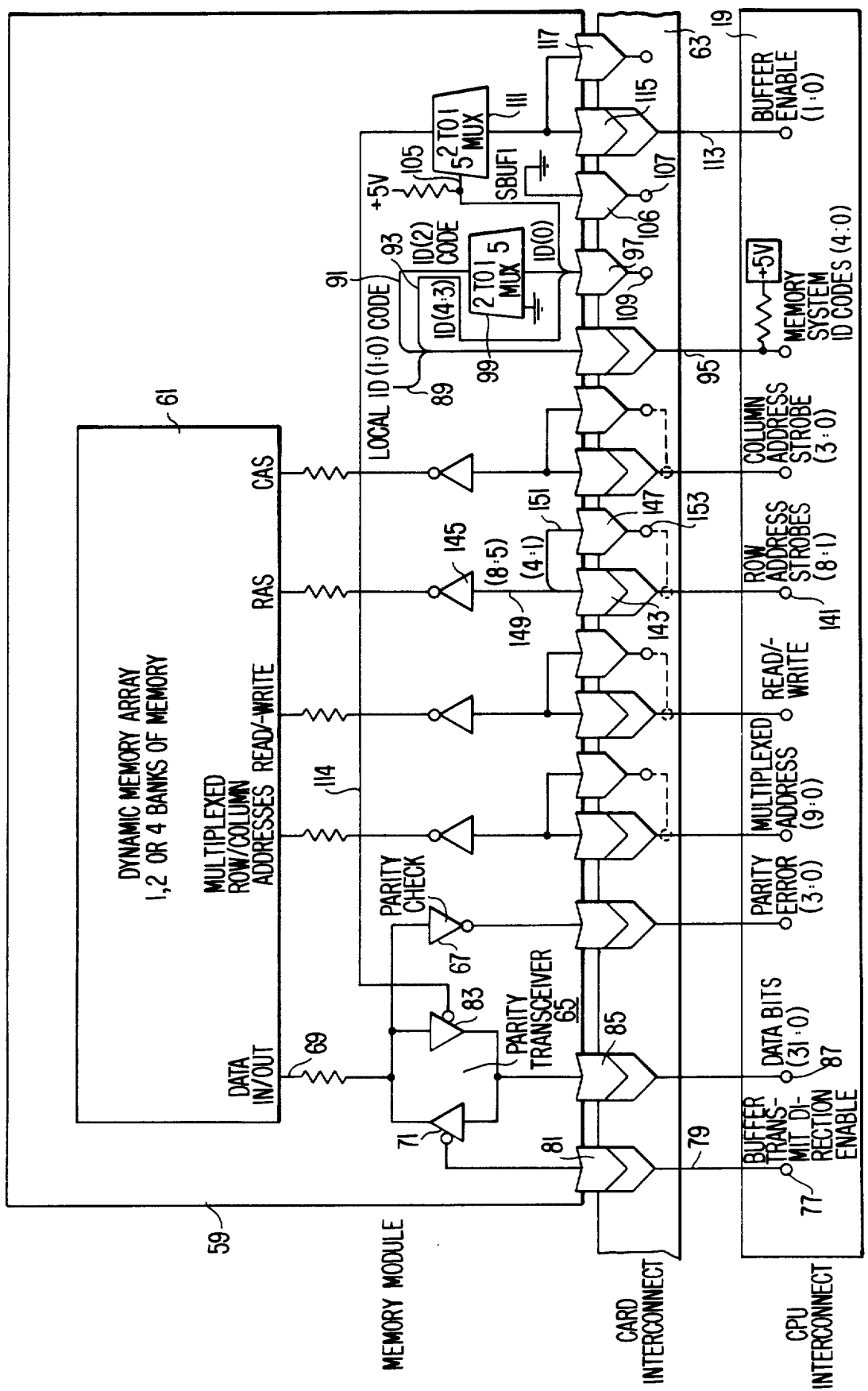
FIG. 2 is a block, schematic diagram depicting an expandable memory circuit card plugged into a first slot.

In determining the generation of the RAS signal let us consider FIG. 2 along with FIG. 1. In FIG. 2 there is shown an expandable memory circuit card 59. On the expandable memory circuit card 59 there is shown banks of memory 61. An expandable memory circuit board, such as board 59, may have, in a preferred embodiment, any one of three different amounts of memory. The card 59 may have one, two, or four banks of memory. Note that the expandable memory circuit card 59 is plugged into a card interconnect bus 63 as well as into the CPU interconnect bus 19. Actually the card bus 63 and the CPU bus 19 are a one bus device and there are some lines in the bus which are dedicated to interconnecting the cards.

A number of the circuits used with the expandable memory circuit card are similar to the circuits used with the memory array card 35 described in connection with the discussion above related to FIG. 1. For instance, the parity transceiver 65 and the parity check circuit 67 are both part of a AM29853 manufactured by Advanced Micro Devices. When data is transmitted into the banks of memory 61 through the data in/out port 69, such data passes through the buffer 71 of transceiver 65. Buffer 71 is enabled by the buffer transmit direction enable signal which is transmitted from the control logic 13 in FIG. 1, along line 73 to the CPU interconnect bus 19, at terminals 75, from the terminals 77 in FIG. 2, along line 79, through the connector 81 to the gate terminal on buffer 71. When data signals are transmitted from the banks of memory 61, from the data in/out port 69, such data passes through the buffer 83, through the connector 85, to the bus 19, at the terminals 87. The enable signal to the buffer 83 shall be discussed below.

Before proceeding further with a description of the circuitry of FIG. 2, let us consider the role of the coded signals generated by the expandable memory circuit cards. It should be understood that, in a preferred embodiment, there are two slots into which an expandable memory circuit card can be plugged. The first slot is considered the high order slot while the second slot is considered the low order slot. The same cards can be plugged into either slot.

When an expandable memory circuit card is made up, it is equipped with either one bank of memory, two banks of memory, or four banks of memory. Depending on the amount of memory, certain voltages are applied to five lines on the card. In FIG. 2, the lines 89 represent the zero and one identification (ID) bits, while line 91 represents the "two" identification bits, and the lines 93 represent the third and fourth ID bits. For instance, as can be seen from FIG. 3, if a card has one bank of memory, then its four (4) through zero (0) bit lines will be HHHHL, where H is high and L is low. The power inputs are not shown in FIG. 2 but it should be understood that the high (H) and low 91 voltages are applied to the lines 89, 91, and 93 from the back of the board. The provision of high and low voltages to the lines 89, 91 and 93 can be accomplished in any number of ways.

If there is only one expandable memory circuit card employed it must be located in the first slot and the five output signals on lines 95 will be the same as generated from the power sources on the lines 89, 91 and 93. However, if a second card is employed, it will be located in slot 2 and will transmit signals to the connector 97. The fourth ID bit signal from the lower order card (i.e. the card in the second slot) will be coupled through the connector 97 to the fourth ID bit on one of the two lines 93. If the fourth ID bit from the second card is low then the combined fourth ID bit will be low and hence the fourth ID bit of the lines 95 will be low. The one ID bit from the second card is coupled to the third ID bit of the first card and if either the one ID bit from the second card or the third ID bit from the first card is low, then the combined third ID bit is low on the lines 95. The zero ID bit from the second card is transmitted to the MUX 99. Before proceeding, it should be recognized that if the card 59 were placed in the second slot, the MUX 99 would not be activated to pass the zero ID bit to the second ID bit of the first card. Hence the need for MUX 99 is that the card 59 may be plugged into the first slot. Considering again the zero ID bit from the second card, we find that it is connected to the MUX 99, which is activated since the card 59 is in the first slot. Accordingly the zero ID bit is coupled to the second ID bit of the first card and if either be Low (1), then the second ID bit on lines 95 will be low. The possible combinations are numerous and a study of FIGS. 3 and 4 provides a basis for better appreciation.

Figures 3, 4:
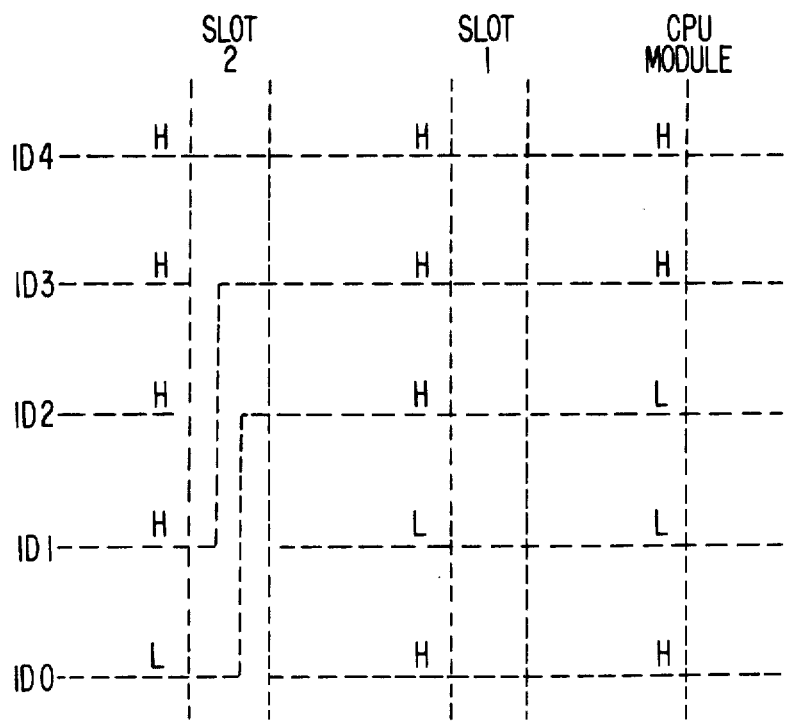
FIG. 3 is a table of possible coded signals generated by a circuit card or by circuit cards.
FIG. 4 depicts a logic scheme to implement the table of FIG. 3.

In FIG. 3 it can be seen that if there are no cards present only the local memory of FIG. 1 will be present and in a preferred embodiment the local memory has only one bank of memory. By way of example, note that if the first card were to have two banks of memory its five ID bits would be HHHLH (see identifier 101). Also by way of example note that if a second card were employed and it had one bank of memory, the combined ID signals would be HHLLH (see identifier 103). The logic for the implementation can be seen in FIG. 4. If we enter the code for a one bank card from FIG. 3 (i.e. HHHHL) into the second slot in FIG. 4 and we enter the code for a two bank card from FIG. 3 (i.e. HHHLH) into the first slot in FIG. 4 then we can follow the logic. Note in FIG. 4 that at the four ID level, the lines from the second and first card are connected. In our example, both signals are H so there is an H at the CPU, or on lines 95. In the three ID level, the signal from the second slot goes nowhere, but the three ID level of the first card is tied to the one ID level of the second card. Since the one ID level of the second card is H and the three ID level of the first card is H, there will be an H on the three ID line, of the lines 95, to the CPU. In FIG. 4 it is apparent that the two ID level of the second card goes nowhere but the two ID level of the first card is tied to the zero level of the first card. Since there is an L signal on the zero ID level of the second card it wil negate the high signal on the two ID level of the first card signal and hence there will be an L signal on the two ID line to the CPU. From FIG. 4 it is apparent that the one ID level and zero ID level of the first card are not influenced by the signals from the second card and hence they remain unchanged. Accordingly there is an L signal on the one ID line to the CPU and H on the zero ID lines to the CPU. It follows that our combined code to the CPU is HHLLH.

If we examine FIG. 3, we find that the output to the CPU shown in FIG. 4 matches the comined output 103 in FIG. 4. Every combination of banks of memory is handled in FIG. 3 and every combination can be implemented by the logic of FIG. 4.

If we again consider the circuitry of FIG. 2 we can understand that signals on lines 95 represent a combined amount of memory available because of the presence of two expandable memory circuit cards.

Note in FIG. 2 that the MUX 99 is activated by the signal SBUFI on line 105. If the card is put in the first slot, SBUFI is high. However, when the card is put in the second slot, the card interconnect 63 provides a connector between terminals 107 and 109, so that line 105 goes low (L) and the MUX 99 is not activated.

The MUX 111 operates in two ways to accommodate two data paths. When the card 59 is in the first slot, there is a high signal on line 105 to cause MUX 111 to accommodate a first data path. When card 59 is in the second slot, the ground signal, through connector 106, through terminal 107 to trminal 109, provides a low signal on line 105. When there is a low signal on line 105 the MUX 111 accommodates a second data path. In the second slot the card interconnect provides a connection between terminals 107 and 109. Now MUX 111 handles the buffer signals on lines 113. The buffer enable signals will appear on lines 113 as 10 or 01. If the buffer enable signals appear as 10 then those signals are sent to the MUX 111 from connector 115 and to a similar MUX 111 in the second card through connector 117. However, if MUX 111 in the first card passes the ONE bit on line 119 to enable the buffer 83 on the first card, then the ONE bit of the 10 enable signals will be blocked by the MUX 111 in the second card. If the buffer enable signals were 01, then the MUX 111 of the second card will pass the ONE bit to enable the buffer 83 on the second card. The ONE bit of 01 would be blocked by the MUX 111 of the first card.

Consider now the role of the five coded signals on lines 95 after they have been transmitted over the bus 19 to the circuitry of FIG. 1. In FIG. 1, the five coded bits enter the terminal lines 121 and are transmitted through the connector 123 to the encode PROM 125. The encode PROM 125, in a preferred embodiment, is a AM27513A manufactured by Advanced Micro Devices.

It should be noted at this point, that in the preferred embodiment, the ability to have each memory array card be one of two dynamic memory density technologies is facilitated by the fifth code from line 127. This extra code expands the possible memory array card combinations to include a 2 bank arrangement of the higher density dynamic memory devices. However, FIG. 3 is concerned with only one memory density technology in a one, two, or four bank arrangement, and requires 13 permutations of the ID codes. With the fifth ID code implemented, 21 permutations of the ID Codes are necessary.

The encode PROM 125 is loaded to (1) receive every possible combination of coded signals from lines 126 and 127 that could be valid or invalid, and (2) produce the correct four bit output signals. The two bits on lines 129 provide the following information: the memory sought is the local memory 35; the memory sought is the memory array 61 of the first card; the memory sought is the memory array 61 of the second card; or the address sought is invalid. The two bits on lines 131 provide information indicating which bank of memory is sought.

The four bits are transmitted to the 1 of 10 RAS Decoder 133. The RAS Decoder 133 provides 1 of 10 signals. Eight of those signals correspond to the eight possible banks of memory on the two expandable memory circuit cards. It will be recalled that an expandable memory card can have one, two or four banks of memory. If each of the two expandable memory circuit cards had four banks of memory then that would constitute eight possible banks of memory. As mentioned earlier, eight of the possible ten output signals from RAS Decoder 133 are directed to those eight possible banks. The ninth signal from the RAS Decoder is directed to the local memory 35. The tenth is an error signal (invalid address) on line 135.

The eight possible signals are transmitted over eight separate lines 137 through the connector 139 to the CPU interconnect bus 19. The eight possible signals are received from bus 19 through the terminals 141. The eight possible signals are transmitted through the connector 143. The eight lines are separated after leaving the connector 143. Four of the lines are connected to the buffers 145 and the remaining four lines are connected to the conectors 147. It should be understood that although there are ten lines emerging from the RAS Decoder 133, there is only one signal present. If that one signal is present on the lines 149 it will be transmitted to its associated latch to activate that latch so that the column and row address as stored therein can operate on the correct bank of memory. On the other, if that one signal emanating from the RAS Decoder 133 is on lines 151, that signal will be sent through the connector 147 to the card interconnect bus 63. The terminals 153 are connected through the card interconnect 63 to a connector 143 on the second card (shown in phantom). Hence, if that one signal from RAS Decoder 133 were on the lines 151 it would serve to activate an associated latch on the second card. If that one signal from RAS Decoder 133 were on line 155 it would activate a latch on the local memory card 35.

If there were not four banks of memory on each of the two cards then the coded signals into the encode PROM would generate output signals from the RAS Decoder 133 which would reduce the number of possible signals to the number of banks present. If the program called for an address beyond the limit present then such an address would appear as an invalid address.

The drawings show a CAS strobe signal having four bits. In a preferred embodiment the memory is organized into four columns of eight bits plus a parity bit.

The CAS strobe is directed to one of those four columns. The CAS strobe signal is generated by the control logic 13 in response to the program knowing that in accordance with the organization of the memory that a certain address will be (by way of example) in the third column of eight bits.

The present invention enables the user to readily expand the memory by merely plugging in a universal card. The CPU looks at the memory including the added memory as one large memory. By having the cards generate coded signals, indicating memory capacity and by having the cards combine their coded signals to provide a combined set of coded signals, the present arrangement provides intelligence to the data processing system to enable the system to reliably and easily address all of the memory available. It should also be understood that while the present system has been described with one, two, or four banks of memory per card, the memory units could be expanded to a greater number of banks and there could be more than two card slots available, for instance, three or four card slots. There could also be a mixture of dynamic memory technology devices such that bank sizes could vary depending on the array technology.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A self-configuring memory circuit which is accessed by a central processing unit generating address signals for said memory circuit, the memory circuit comprising:

interconnect means for transferring configuration signals from a plurality of separate memory modules to the central processing unit serially through said modules, each of said modules receiving from said interconnect means one of said configuration signals and each providing to said interconnect means another one of said configuration signals;

each of said plurality of memory modules being serially connected to said interconnect means at locations which are in increasing distance from the central processing unit, and each of said memory modules being capable of having one of a plurality of memory sizes and including means for receiving from said interconnect means one of said configuration signals as a prior configuration signal specifying a cumulative size of all of said memory modules more distant from the central processing unit along said interconnect means, said prior configuration signal being generated by an adjacent one of said memory modules more distant from the central processing unit on said interconnect means or being equal to a preset value for the memory module most distant from the central processor unit, and said prior configuration signal being composed of a first plurality of bits capable of representing all of the possible cumulative sizes for said more distant memory modules, means for generating a size signal identifying the one of said plurality of memory sizes of the memory module, said size signal being composed of a second plurality of bits, means for combining the size signal and the prior configuration signal to form a present configuration signal in compacted form being composed of a total number of bits no greater than the sum of said first and second pluralities of bits, said combining means including logic circuit elements coupled to receive the size signal and the prior configuration signal and generating a compacted present configuration signal, and means for providing the compacted present configuration signal to said interconnect means; and interface means, coupled between the central processing unit and said interconnect means, for receiving the present configuration signal provided from the memory module least distant from the central processing unit for encoding said transferred present configuration signal with said address signals from said central processing unit to select ones of said memory modules for access by the central processing unit.

2. The self-configuring memory circuit of claim 1 wherein each of said memory modules also includes means for generating a location signal identifying the location of the module from the central processing unit along said interconnect means; and wherein said combining means in each of said memory modules includes means for combining the location signal with the size signal and the prior configuration signal to form the present configuration signal.

3. The memory circuit in claim 1 wherein said interface means includes a PROM having address inputs coupled to said interconnecting means to receive said configuration signals, and having output signals representing each of said memory modules.

4. The memory circuit in claim 3 wherein said interface means also includes a decoder coupled to said PROM to receive said PROM output signals, said decoder including means for producing selection signals for access of the memory circuit by the central processing unit.

5. The memory circuit in claim 1 wherein said memory modules each contains memory banks, and wherein each of said memory module size signals indicates the number of memory banks contained in the corresponding memory module.

6. The memory circuit of claim 1 wherein said interconnecting means includes:

a plurality of mounting slots each including a set of pin connectors, and means for electrically connecting selected ones of said set of pin connectors of different mounting slots.

7. A memory module in a self-configuring memory circuit accessed by a central processing unit which generates address signals for the memory circuit, the memory circuit including a backplane containing a plurality of mounting slots, each with a set of pin connectors selectively connected together serially for transferring configuration signals from said memory module and from a plurality of separate memory modules to the central processing unit, a PROM coupled between the central processing unit and said backplane, and a decoder, wherein each of said modules receives from said backplane one of said configuration signals as a prior configuration signal specifying a cumulative configuration and size of all of said memory modules more distant from the central processing unit along said backplane, wherein each of said modules provides to said backplane another one of said configuration signals as a present configuration signal, wherein said PROM has address inputs for receiving the present configuration signal provided from the memory module least distant from the central processing unit along said backplane, wherein said PROM produces output signals representing each of the memory modules, and wherein said decoder receives the PROM output signals to select ones of said memory modules during access of said memory modules by the central processing unit, said memory module being connected to said backplane, being capable of having one of a plurality of memory sizes, and comprising:

means for receiving one of said prior configuration signal from an adjacent one of said separate memory modules more distant from the central processing unit on said backplane, or, if said memory module is most distant of said memory modules from the central processing unit, a preset value, said prior configuration signal being composed of a first plurality of bits capable of representing all the possible configurations and cumulative sizes for said more distant memory modules;

at least one memory bank;

means for generating a size and configuration signal identifying the number of memory banks on said module, said size and configuration signal being composed of a second plurality of bits;

means for combining the configuration and size signal and the prior configuration signal to form said present configuration signal in compacted form, said present configuration signal indicating a configuration and cumulative size of said memory module and of said separate memory modules more distant from said central processing unit along said backplane, said compacted present configuration signal being composed of a total number of bits no greater than the sum of said first and second pluralities of bits, said combining means including logic circuit elements coupled to receive the size signal and the prior configuration signal and generating said compacted present configuration signal; and means for providing said compacted present configuration signal to said backplane.

* * * * *